Sept. 23, 1969  J. A. DES ORMEAUX ET AL  3,468,269
METHOD AND APPARATUS FOR CUTTING TAPE IN SEWING MACHINE
Filed May 1, 1967
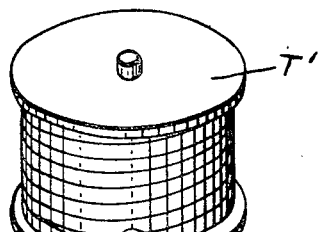
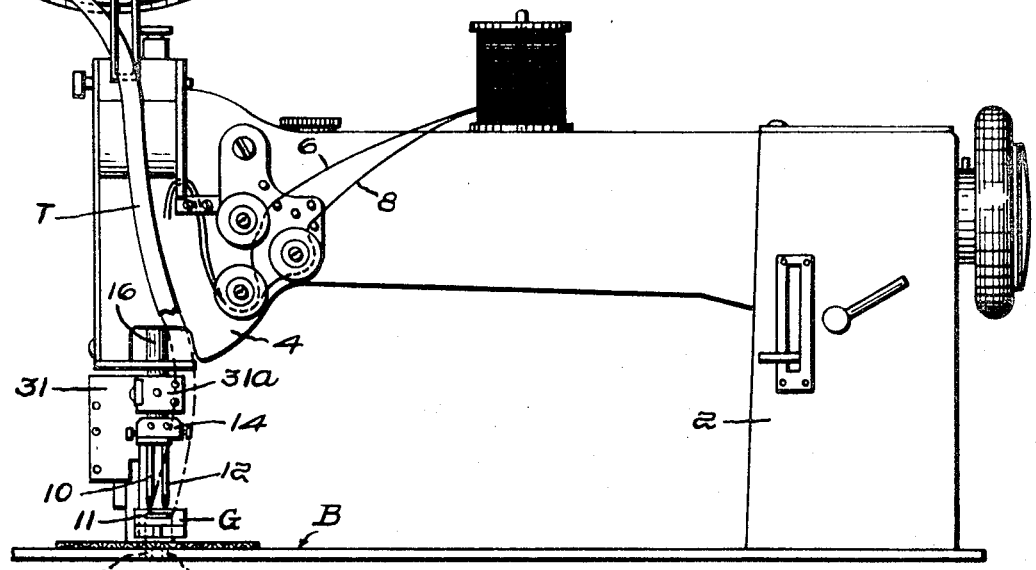
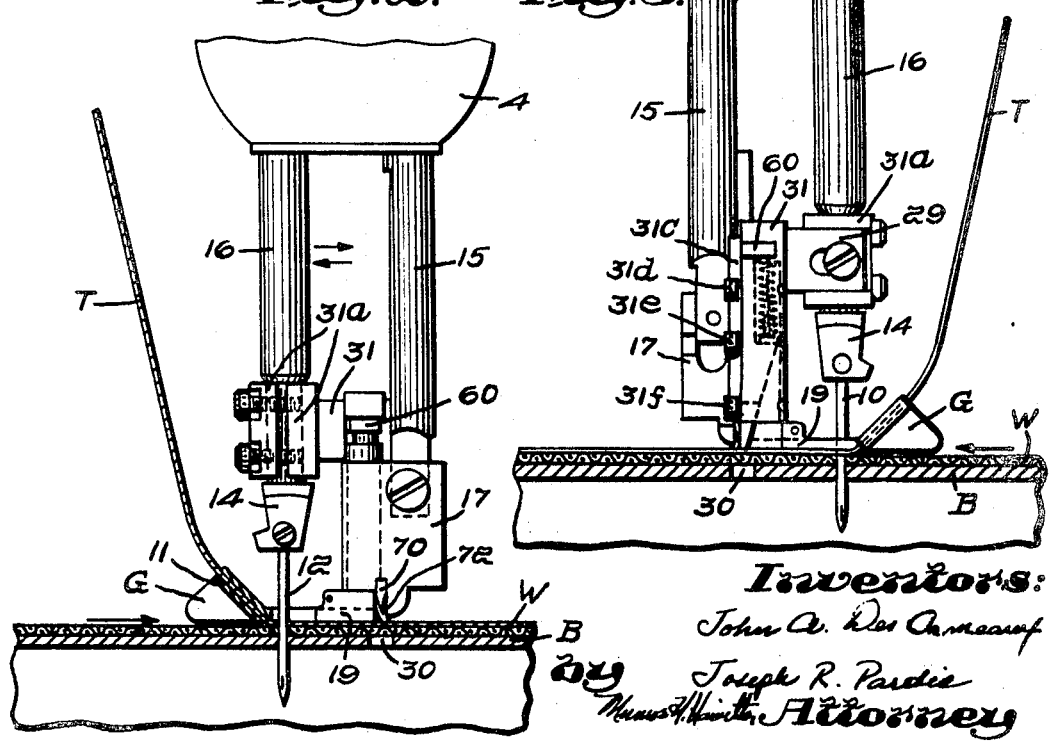
Inventors:
John A. Des Ormeaux
Joseph R. Pardue
Attorney

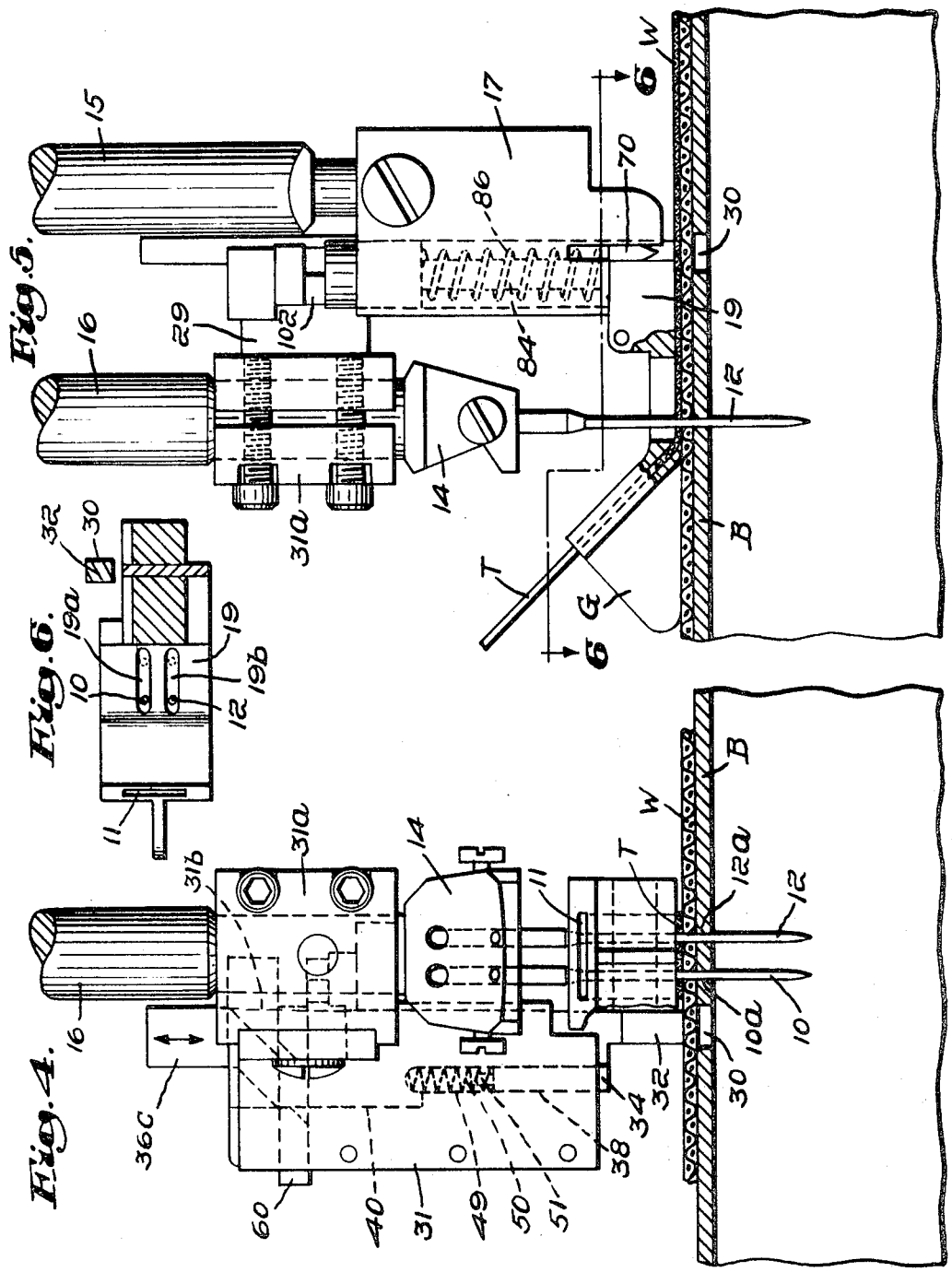

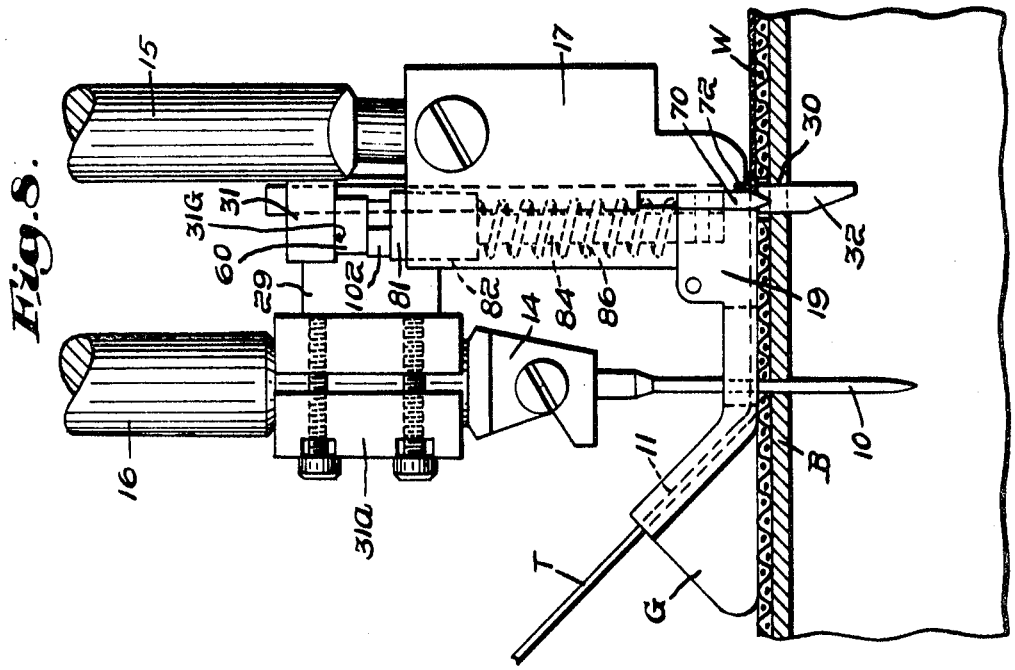
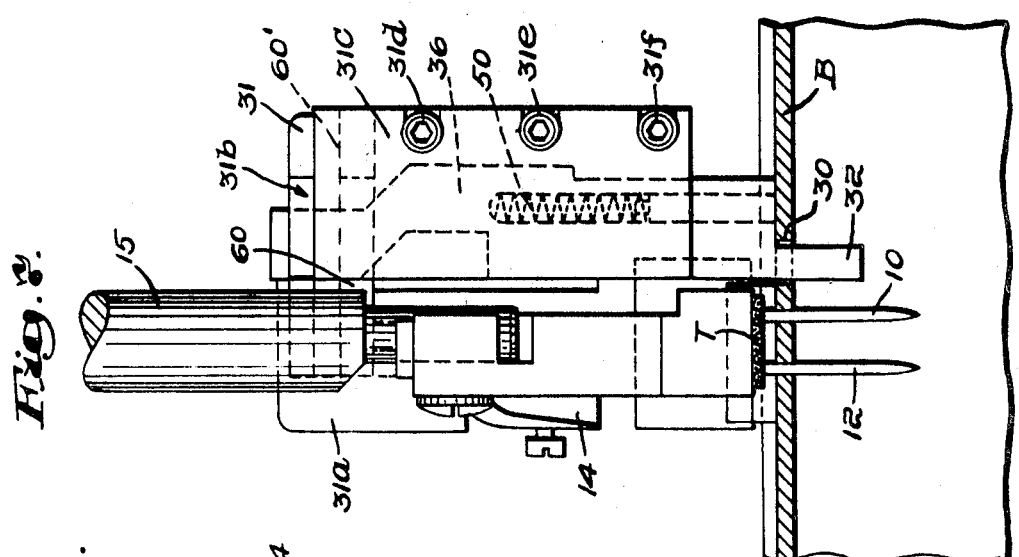
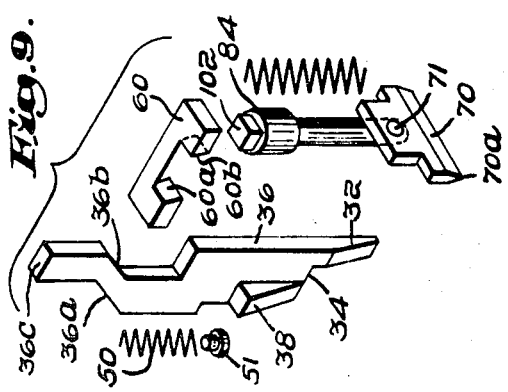

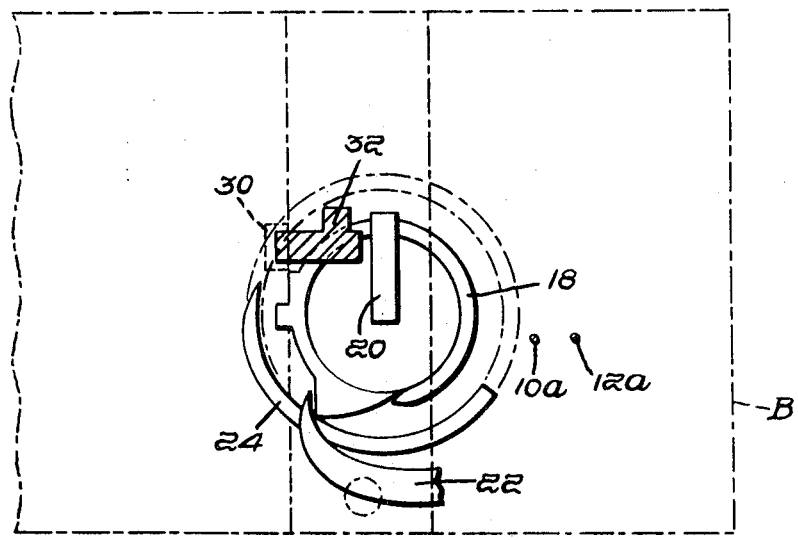
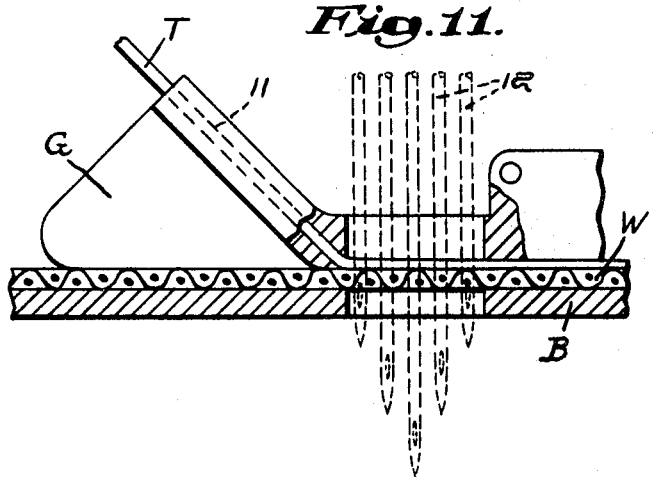
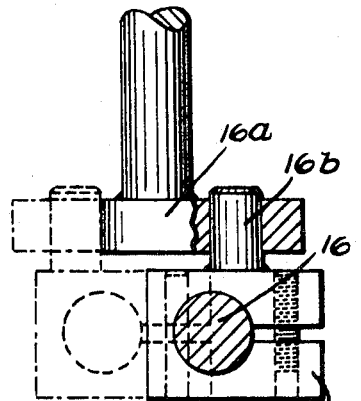
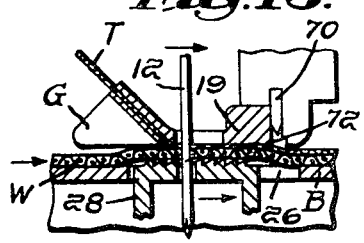
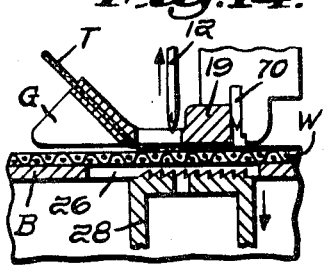
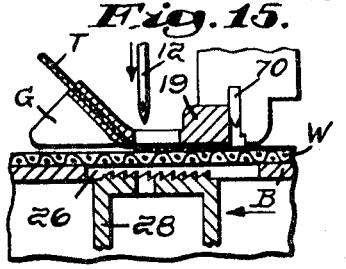
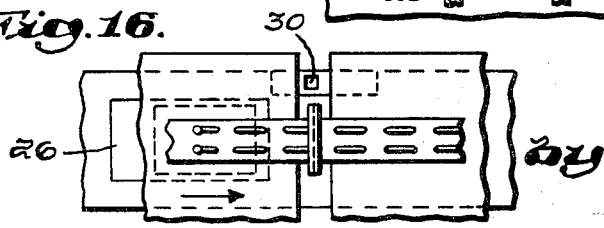

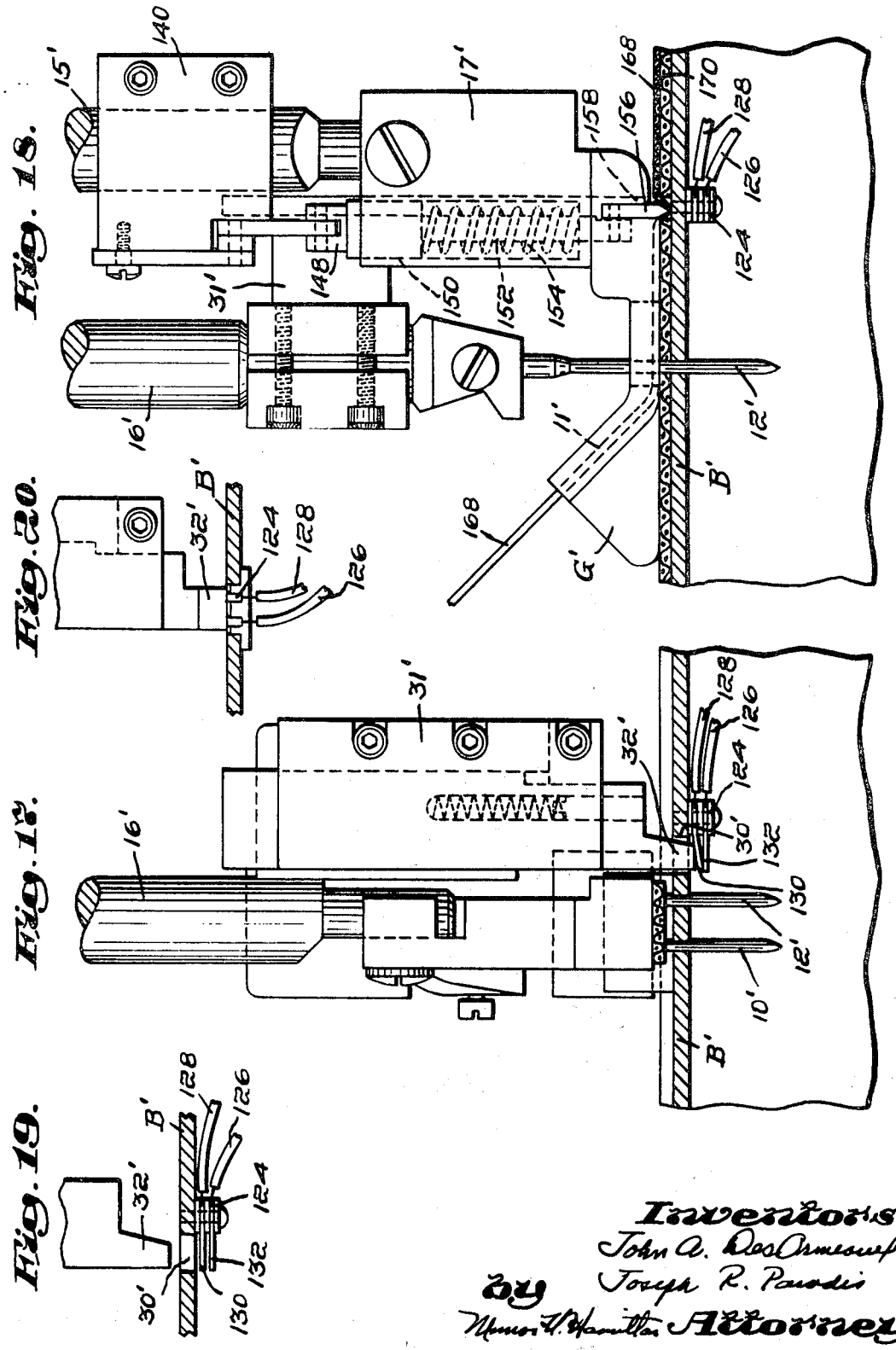

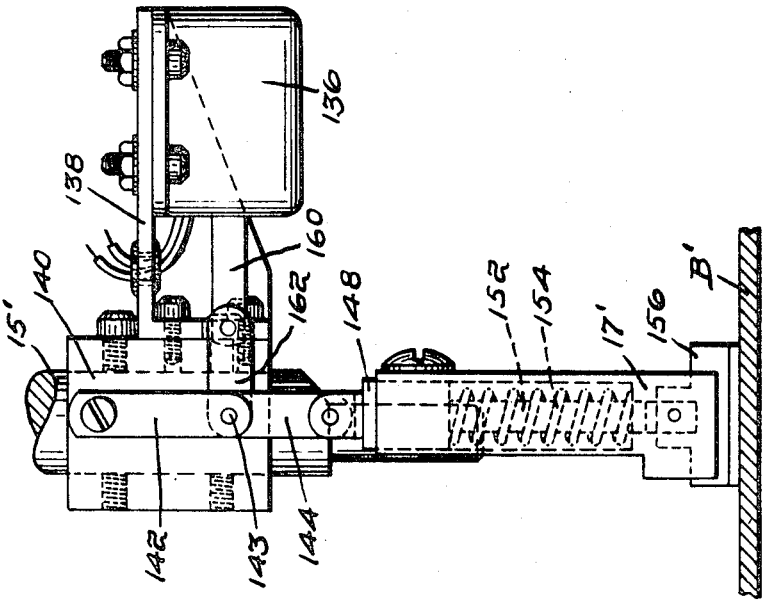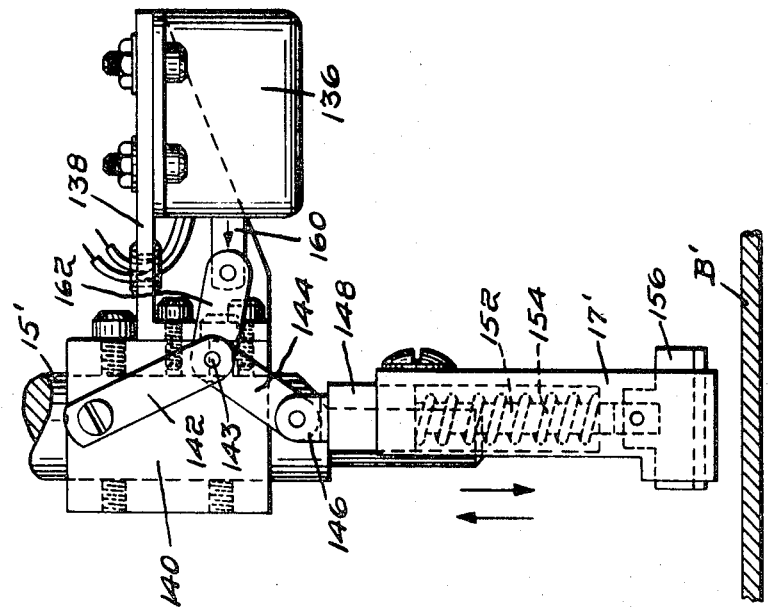

Sept. 23, 1969   J. A. DES ORMEAUX ET AL   3,468,269
METHOD AND APPARATUS FOR CUTTING TAPE IN SEWING MACHINE
Filed May 1, 1967   7 Sheets-Sheet 7
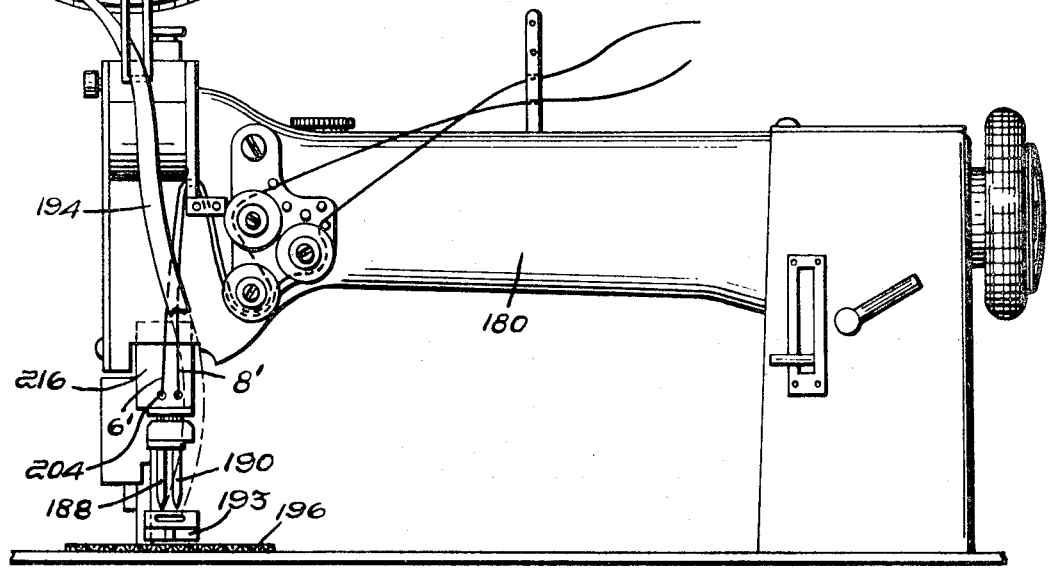

United States Patent Office 3,468,269
Patented Sept. 23, 1969

3,468,269
METHOD AND APPARATUS FOR CUTTING TAPE IN SEWING MACHINE
John A. Des Ormeaux, Bradford, and Joseph R. Paradis Wayland, Mass., assignors to Frederic P. Worthen
Continuation-in-part of application Ser. No. 384,929, July 24, 1964. This application May 1, 1967, Ser. No. 635,127
Int. Cl. D05b 37/04, 53/00
U.S. Cl. 112—130                               3 Claims

ABSTRACT OF THE DISCLOSURE

A method and apparatus for cutting thread, tape and other fastening materials used in sewing machines of the travelling needle bar type characterized by a vertically reciprocating sensing mechanism attached to the sewing machine needle bar and cooperating with an aperture in the sewing machine table to selectively actuate a cutter mechanism. A stationary presser foot bar resiliently supports the cutter mechanism in a position to be selectively actuated by the sensing mechanism when the aperture is uncovered.

---

This application is a continuation-in-part of co-pending application Ser. No. 384,929 filed July 24, 1964, now United States Patent No. 3,330,236 issued July 11, 1967, entitled Cutting Mechanism for Sewing Machine and Method of Cutting Material.

The present invention relates to cutting methods and mechanisms and, more particularly, to cutting mechanisms for cutting tape, thread and similar fastening materials employed in sewing machines. Reference is had especially to sewing machines of the travelling needle bar class in which a vertically oscillatable needle bar with needle holder and needles are arranged to stitch a tape material on a piece of fabric moved under a stationary presser foot by means of a cloth feeding mechanism. In this travelling needle bar class of sewing machine, the needle or needles pass into the tape and workpiece to form a stitch and the needle bar, tape and workpiece all move ahead through a limited path of travel.

In conventional sewing machine operation a problem arises in cutting off tape, thread or other fastening material at the point at which a stitching operation is completed on one workpiece and continued on another workpiece immediately advanced along the work supporting base of the machine. Various forms of conventional cutting mechanisms have been proposed for this purpose and these mechanisms are customarily located rearwardly of the presser foot. In this relative position it frequently happens that interference or jamming may develop from irregular movement of the cloth and this may result in faulty cutting, loss of operator time and lowered efficiency.

It is a principal object of the present invention to deal with the cutting problem indicated and to devise improved cutting methods and means which will automatically perform a desired cutting step with respect to thread, tape, binding or other material at predetermined points without interruption of the stitching operation as it passes from one workpiece to another.

It is further an object of the invention to devise a cutting mechanism which may be embodied in the form of an attachment capable of being mounted on sewing machine needle bars and presser foot bars with only minor alteration of these members as they occur in conventional sewing machines of various types including specifically the travelling needle bar class of sewing machines above described.

Still another object is to provide a cutting arrangement which will avoid interference with standard cloth feeding means and which is capable of running at desired speeds for extended periods of time without breakdown.

These objectives may, we find, be realized in a desirable manner by carrying out a selective cutting operation based on the novel concept of continuously moving a sensing member with the needle bar of the sewing machine and displacing the sensing member vertically upwardly at all times when a workpiece is in the path of travel of the sensing member. At those points at which no workpiece surface is contacted, the sensing member moves downwardly into a sensing aperture in the machine base and this extended travel of the sensing member inititates a cutting motion.

In carrying out the method of the invention, we employ a vertically adjustable knife or cutter member which is supported in the presser foot bar of the machine and which normally remains in a raised position during the conventional stitching operation. In the raised position noted, the cutter member may be selectively actuated at predetermined points by sensing mechanism which operates through a conveniently located aperture in the work supporting base of the machine.

The nature of the invention and its other objects and novel features will be more apparent from the following description of preferred embodiments selected for purposes of illustration and shown in the accompanying drawings, in which:

FIGURE 1 is a side elevational view of a conventional sewing machine of the travelling needle bar class;

FIGURE 2 is a detail view showing a portion of the travelling needle bar mechanism shown in a stitching position with respect to a fabric piece and a tape being stitched thereto;

FIGURE 3 is a view similar to FIGURE 2 but taken at an opposite side of the sewing machine;

FIGURE 4 is a detail view partly in cross section showing details of a feeler mechanism associated with the needle bar assembly;

FIGURE 5 is a detail elevational view partly in cross section showing the parts indicated in FIGURE 4 but viewed from one side thereof;

FIGURE 6 is a cross section taken on the line 6—6 of FIGURE 5;

FIGURE 7 is another detail elevational view of the needle bar and sensing mechanism shown with a sensing element in a position to permit a cutting operation to take place;

FIGURE 8 is a view of the parts in the position shown in FIGURE 7 viewed from one side thereof;

FIGURE 9 is a detail assembly view of a cutter and cutter actuator slide components employed in the apparatus shown in FIGURES 1 to 8 inclusive;

FIGURE 10 is a diagrammatic plan view of a portion of the sewing machine table with bobbin mechanism indicated at an underside thereof;

FIGURE 11 is a diagrammatic view partly in cross section of a series of stitching positions assumed by needles in the needle bar mechanism;

FIGURE 12 is a detail view of means for producing travel of the needle bar in a desired path of movement;

FIGURES 13, 14 and 15 are views illustrating in detailed cross section progressive steps in a stitching operation and further illustrating movement of the feed bar means for engaging against an underside of a workpiece and advancing same in a desired path of travel;

FIGURE 16 is a detail fragmentary plan view of two workpieces with a cutting operation indicated diagrammatically;

FIGURE 17 is a detail front elevational view of a needle bar and sensing mechanism combined with electromechanical means for controlling a tape cutting step;

FIGURE 18 is a view showing the parts of FIGURE 17 viewed from one side thereof;

FIGURE 19 is a detail cross sectional view of a feeler element and electrical switch arrangement;

FIGURE 20 is a view showing a cutting element in a cutting position controlled by the electromechanical device;

FIGURE 21 is an elevational view showing portions of a sewing machine presser foot bar having a cutting knife associated therewith and solenoid control means of FIGURES 17 to 20 inclusive illustrated;

FIGURE 22 is a view similar to FIGURE 1 showing the parts of the cutting means in a cutting position;

FIGURE 23 is a side elevational view of a sewing machine equipped with a thread nipping modification;

FIGURE 24 is an elevational view showing the thread nipping device in the position assumed when the needle is in a stitching position; and FIGURE 25 is a detail elevational view illustrating the thread held in a nipped position during upward movement of the needle bar.

The components of the present invention and their arrangement as illustrated in the above-noted figures differ from Patent No. 3,330,236 earlier referred to in that the sensing means is designed to be carried out by a traversing needle bar which moves forward and back through a limited path of travel, as well as undergoing vertical reciprocation, and in that a knife mechanism cuts both tape and thread. It will be understood, however, that this invention as in the case of Patent No. 3,330,236 may be applied to stitching various classes of workpieces including specifically tapes, small fabric workpieces as used in shoe linings and canvas footwear and various other materials.

In a preferred embodiment of the invention a series of workpieces, together with a continuously fed strip of tape material are advanced along a work supporting base as illustrated in FIGURES 1–3 inclusive. The sensing aperture referred to above is located immediately below the path of travel of the workpiece, but outside of the path of travel of the tape material. During the period a workpiece passes along the work supporting base and over the sensing aperture, stitches are applied through the tape and workpiece preferably in the form of two rows of stitching. This is accomplished by means of vertically reciprocated needle means of the customary type which pass downwardly through the work supporting table in timed relationship to movement of bobbin and thread handling mechanism located below the base.

While stitches are being applied, the workpiece is periodically engaged along one edge by a sensing member which is resiliently supported on the vertically reciprocating needle means at a point directly above the said sensing aperture whereby the sensing member is displaced vertically upwardly by contact with the workpiece during each stitching cycle. At those intervals when a workpiece moves away from the needle means and the sensing member is free to enter the sensing aperture, a cutter is actuated and caused to move downwardly into a cutting position against the tape material and threads lying across the work supporting base.

In one desirable form of cutter and sensing arrangement a downwardly exerted force on the cutter is transmitted directly from the sensing apparatus through a cam and slide mechanism generally corresponding to the cam and slide mechanism of Patent No. 3,330,236. It should be understood, however, that various other mechanical arrangements may be employed to transmit a downward cutting force and in addition we may desire to employ electrically actuated devices such as a solenoid where energization is selectively controlled by movement of the sensing member as hereinafter disclosed in this application.

Considering in greater detail the various parts referred to, attention is directed to FIGURE 1 wherein we have illustrated a sewing machine 2 having a stitching head 4 to which is supplied strands of stitching material as thread indicated by numerals 6 and 8. The thread passes down into a pair of vertically reciprocating needles 10 and 12 mounted in a holder 14 of a needle bar 16. The needles in their lowermost position extend downwardly through needle openings 10a and 12a in a reciprocating feed member 28 hereinafter described in greater detail.

The needle bar 16 is supported for movement forward and back while being reciprocated in a conventional manner. In this conventional arrangement an arm is pivotally mounted in the machine head and has a lower bearing portion through which the needle bar is pivotally reciprocated. The forward and back motion is accomplished by a rotating member 16a mounted in the machine and indicated in FIGURE 12. A pin member 16b is carried by the rotating member 16a and at its opposite end is solidly secured to a clamping block 16c fastened to needle bar 16. Rotative movement of member 16a moves needle bar 16 into the dotted line position of FIGURE 12 and then back to the full line position shown.

Closely adjacent to the reciprocating needle bar is a stationary presser foot bar 15 which is fixed in the stitching head 4. At the lower end of the presser foot bar 15 is a retainer block 17. Pivotally attached to a lower front edge of the block 17 is a presser foot element 19 most clearly shown in FIGURE 6. As indicated in FIGURE 6 the presser foot 19 is formed with elongated needle slots 19a and 19b through which the needles 10 and 12 may descend and move forwardly as earlier described. At the front end of the presser foot 19 is further provided a tape guide portion G through which is located an angled tape slot 11.

FIGURE 10 illustrates diagrammatically a recessed base portion B of the sewing machine immediately below the needles 10 and 12 and presser foot 19. Located in this recessed base B is a conventional bobbin mechanism 18, a bobbin clip 20 and thread engaging members 22 and 24. The members 22 and 24 periodically rotate and cooperate with needles 10 and 12 in the well-known manner to form stitches in a fabric or other workpiece advanced under the presser foot 19.

A tape material T is fed from a spool T' located at an upperside of the sewing machine downwardly through a guide clip into the tape slot 11 in the tape guide G so that the tape passes over a workpiece immediately below the needles 10 and 12. Also formed in the base B (FIGURE 16) is a feed slot 26 through which projects a movable feed member 28 further illustrated in FIGURES 13–15.

In the conventional operation of the mechanism described, a workpiece is advanced under the presser foot by an operator and is engaged by the feed member 28. At the same time a tape material is located along the upper side of the workpiece in spaced relation to one edge thereof as suggested in FIGURE 16. Needles 10 and 12 pass down through the tape and workpiece and the needle apertures in the feed element. Thereafter all of these components and parts move from left to right in the manner suggested in FIGURES 2, 13 and 15. As shown in FIGURE 14 the feed element 28 then drops down out of contact with the bottom of the workpiece and begins to return to a starting position. At the same time the needles and needle bar move upwardly and back.

In accordance with the invention we form the base B with a special sensing aperture 30 best shown in relation to the bobbin mechanism in FIGURE 10 and also shown in FIGURES 3–8 and 16. This sensing aperture 30 is arranged to receive a resiliently supported sensing element 32 which is actuated by movement of the reciprocating needle bar.

It will be appreciated that only a limited amount of space is available for advancing a portion of a fabric to be stitched and at the same time locating a cutting mechanism in a position to cut both tape and thread. Because of this it becomes necessary to place the sensing aperture 30 at a point which falls above and inside of the arc of rotation of the thread handling elements 22 and 24 in the bobbin mechanism below the base B. Thus a problem of interference with the bobbin mechanism arises.

We have determined, however, that there is an interval in the cycle of movement of the bobbin mechanism when a sensing member may move downwardly through the aperture 30 and return without interference with the bobbin mechanism. This movement is accomplished by actuating the sensing member 32 in carefully timed relationship such that the sensing member moves into and out of the aperture while the bobbin members 22 and 24 are moving away from that portion of the arc of rotation where the sensing member enters. It is pointed out that an important feature of the invention resides in the concept of locating aperture 30 within the arc of rotation of the bobbin mechanism and at a point where a sensing member 32 may enter and leave without bobbin interference.

The sensing element 32 may, for example, be attached to the vertically reciprocating bar by means of a sensing support structure 31. This support structure 31 is shown in FIGURES 1-5 and also FIGURES 7 and 8, and includes a bracket part 29 secured to a retainer clamp portion 31a in turn rigidly fastened around the needle bar 16 by means of screws or other suitable fastenings.

The support structure 31 is recessed along one side to form a vertical slideway 31b which is best indicated in FIGURE 7 and further shown in FIGURE 4 in dotted lines. The sensing element 32 is held in this slideway 31b by means of a cover plate 31c rigidly secured by screw members 31d, 31e and 31f also shown in FIGURE 7. The shape of the slideway 31b is so constructed as to slidably receive and guide edges of a cam portion 36 of the sensing element 32. This cam portion is more clearly shown in FIGURE 9 in which figure the sensing member 32 is shown removed from the support structure 31.

It will be observed that the lower tip portion of the sensing element 32 is of a size adapted to enter freely into the sensing aperture 30. A shouldered portion 34 extends angularly away from the sensing portion 32 to overlie and at some point abut against an adjacent surface of the base B immediately surrounding the sensing aperture 30. The cam portion 36 also has formed along one side thereof a guide or rib 38 to which is secured a stud 51. Immediately above the rib 38 the cam portion 36 is formed with cam surfaces 36a and 36b as shown in FIGURE 9 and an upper end portion 36c.

At the upper end of the support structure 31 there is formed a second transversely disposed slideway which intersects at right angles the slideway 31b and which is indicated by the dotted lines 60' as shown in FIGURE 7. In this slideway 60' is slidably received a knife actuating slide member 60 which is arranged in interlocking relation with the cam portion 36 of sensing element 32.

The slide member 60 is best shown in FIGURE 9 and is formed with cam surfaces 60a and 60b which are designed to slidably engage the cam surfaces 36a and 36b of cam portion 36 so that when the sensing member 32 is forced upwardly the slide 60 is moved from left to right as viewed in FIGURE 7 and in an opposite direction when the sensing member moves downwardly. The sensing member 32 and its cam portion 36 is normally held in a downwardly extended position as shown in FIGURE 7. This is accomplished by means of a coil spring 50 located in a recess 49 at an opposite lower side of the support structure 31 as illustrated in FIGURE 4.

The lower end of the coil spring 50 engages over the stud 51 on the rib portion 38 of cam 36. With the sensing member 32 in this downwardly extended position induced by spring 50, the slide 60 is fully displaced to the left as shown in FIGURE 7 and assumes a position in which one end occurs immediately below a recessed shoulder 31g of support structure 31 in the manner indicated in FIGURE 8.

With the arrangement of parts described, it will be noted that when the needle bar 16 is moving downwardly, it carries with it sensing support 31, together with slide 60 and cam portion 36 of sensing element 32. At a point where the sensing element 32 comes into contact with a workpiece, however, the cam portion 36 and sensing element 32 are held stationary while the slide 60 and support 31 continue downwardly a further distance and lateral displacement of the slide takes place. If, however, the sensing element 32 enters aperture 30 and is thereafter arrested by engagement of the shouldered part 34 against the table, the slide 60 is moved downwardly over the cam a relatively short distance without lateral displacement of the slide taking place. These two positions of the knife actuating slide 60 determine whether a cut will be carried out.

An important feature of the cam and slide arrangement described, consists in forming the surfaces 60a and 60b with a degree of angularity which corresponds very closely to the degree of angularity of the cam surfaces 36a and 36b and which at the same time provides for vertical movement of the slide downwardly over the cam for a short distance before the surfaces can come into engagement.

Thus it will be seen that when the part 31 is moving downwardly with the sensing element 32 and cam 36 held stationary, two conditions are possible. In one case where the sensing element 32 has passed through the sensing aperture 30 on the table, the slide is not displaced laterally and moved down into a knife actuating position to contact the cutting knife apparatus as described below. In a second case where the sensing element has moved into contact with the workpiece, the parts 31 and 54 move the slide 60 downwardly over the cam and also laterally to one side so that no contact with the cutting knife apparatus can occur.

The cutting knife apparatus referred to includes a vertically movable knife element and associated parts designed to be actuated by slide 60. This cutting knife apparatus is shown on a somewhat enlarged scale in FIGURES 2, 5, 8 and 9 and includes a knife element 70 slidably supported in a knife slot 72 formed in the presser foot block 17. The block 17 is formed with a cylindrical bore 82 (FIGURE 8) in which is contained a plunger 84. Transversely disposed through the bottom of the plunger 84 is a pin 71 (FIGURE 9) which supports the knife element 70 in a pivoted fashion in the knife slot 72.

The knife element preferably consists of a V-shaped cutter having a cutter edge 70a. Located around the plunger 84 in the vertical bore 82 is a coil spring 86 which normally functions to hold the plunger 84 and the attached knife element 70 in a raised position such as suggested in FIGURES 2 and 5.

It will be apparent, therefore, that the knife or cutter 70 is normally held by the spring 86 in a raised position and will remain in this raised position at all times when the sensing member 32 is displaced by a workpiece on the work supporting base.

However, in the event that the sensing member is not displaced by a workpiece as may occur during the interval when one workpiece is leaving the stitching station and a succeeding workpiece is approaching the station, then the sensing member 32 moves downwardly with its cam portion actuating the slide 60. In such case the cam and slide 60 move downwardly together for a short distance into contact with an anvil portion 102 formed at the top of the plunger 84.

As a result the knife element 70 is forced downwardly into a cutting position as illustrated in FIGURE 8 and cuts both the tape and thread. It will be observed that this cutting operation takes place when the needles are in their lowest position having passed through the tape and fabric and while moving forward with the cloth and tape.

In operation with the parts assembled on the respective needle bar 16 and the presser bar 15 as disclosed, the machine operator advances a workpiece W along the base B and under the presser foot 19 and a tape T is fed through the tape slot 11. The operator then starts the machine and stitching takes place. In each cycle of movement the needle bar 16 moves from a fully raised position as shown in FIGURE 1 into a fully lowered stitching position as shown in FIGURES 2 and 3. At this point the workpiece is held against the presser foot 19 by the feed bar 28 as shown in FIGURE 13.

The needles 10 and 12 move down into the workpiece and through the feed bar 28. Thereafter the needles, workpiece, tape and feed bar all move from left to right, as viewed in FIGURES 13 and 14, and then the needles move upwardly and out of the workpiece. The feed bar 28 drops down out of engagement with the workpiece as shown in FIGURE 15 and thereafter returns to a starting position.

Movement of the sensing member 32 and the knife 70 is controlled in a manner such that the sensing member 32 can only move into sensing aperture 30 when the needles are in the position shown in FIGURE 13 and the knife 70 can only be actuated in this position. This is illustrated in FIGURES 7 and 8 with the needles moving upwardly out of the tape and workpiece after the cut is made.

It will be observed that engagement of the slide 60 with the anvil 102 continues for only a short interval and then the support 31 moves upwardly raising the sensing member 32 out of the aperture 30 in time to avoid interference with the thread engaging elements 22 and 24. Thus it will be seen that this latter step occurs in a timed manner resulting from the location of the aperture 30 in relation to the periphery of the bobbin 18, as well as the travel of the needle bar. It will be also be observed that the knife 70 moves downwardly in timed relation to movement of the feed member 28 which in its conventional travel advances as shown in the drawings.

FIGURES 17–22 inclusive illustrate a modification of the invention in which electrically operated cutting is combined with needle bar actuated sensing of the character above described. In this modification a sensing element operates through a sensing aperture to close an electrical switch when a point of cutting is reached in the stitching operation. The electrical switch closes a circuit which energizes a solenoid which in turn actuates a knife mechanism supported on a presser foot independently of the feeler mechanism.

Considering these operations in greater detail, numeral 32' denotes a sensing member of the type earlier described and mounted for vertical movement on a sensing support 31' attached to a needle bar 16'. The sensing member is resiliently received against a spring 50' in the part 31' and is normally retracted when moved downwardly against a workpiece. With no workpiece present the sensing member 32' enters a sensing aperture 30' located in the base B' in the same relative location with respect to the bobbin mechanism as earlier described.

At the underside of the base B' is secured an electrical switch 124 to which is connected electrical conductors 126 and 128. Supported at one side of the switch 124 are spring contact elements 130–132 which normally extend in spaced apart relation immediately below the sensing aperture 30' as shown in FIGURE 19. In this position spring contacts can be forced together between sensing element 32' as suggested in FIGURE 17 and an electrical circuit is closed through the switch to a solenoid member 136 more clearly shown in FIGURES 21 and 22. Solenoid 136 is supported on an angle bracket 138 fixed to a toggle support block 140 in turn clamped to a presser foot bar 15'. Pivotally secured to an upperside of member 140 is a toggle link 142 joined by a pivot pin 143 to another toggle link 144 whose lower end is pivotally connected to an extension head 146 of a plunger 148. The plunger 148 is received in a recess 150 in the member 17' and carries a knife supporting element 152 surrounded by a coil spring 154.

On the lower end of the element 152 is a knife 156 which is received in a slot 158 in presser foot G'. The coil spring 154 normally maintains the knife 156 in a raised position as shown in FIGURE 21 and in the raised position the toggle links 142–144 are in an angularly disposed position as indicated in FIGURE 21.

When the solenoid is energized by closing switch 124 a bar 160 is moved by the solenoid from the position of FIGURE 21 to the position of FIGURE 22 and acting through a connecting link 162 attached to pivot pin 143, forces the toggle links 142–144 into a straightened position as shown in FIGURE 22. This toggle motion moves the knife 156 downwardly into a cutting position to cut a tape 168 and threads as shown in FIGURE 18. Since the solenoid was energized only momentarily by closing of the switch spring contacts, and since they immediately move apart after being closed by the sensing member, the solenoid is automatically reset by the next sewing operation and the knife is returned to its raised position by the spring 154.

There is thus accomplished an efficient electrical control of the selective cutting operation. It is intended that the specific arrangement of switch and solenoid described is to be illustrative of various other electromechanical or electrical devices for actuating a cutting member supported through a presser foot in the manner described.

FIGURES 23, 24 and 25 illustrate another modification of the invention which relates to thread and tape cutting in combination with a novel thread nipping or thread trapping device.

FIGURE 23 illustrates a sewing machine of the class earlier described indicated by numeral 180 and having a needle bar 182 and a presser foot bar 184 from which is supported a presser foot 186 through which is supported a cutting knife of the type above described. Needles 188 and 190, supported in a holder 192 on the needle bar 182, are moved downwardly through a presser foot 193 to pass thread to a tape element 194 and a fabric 196. A sensing element 198 supported on the needle bar 182 is arranged to actuate a cutting knife to sever tape 194 and threads 6' and 8'.

Supported from the needle bar holder by screws 201 is a thread guide element 202 which is formed with thread eyes 204 through which are passed threads 6' and 8' as shown in FIGURE 24. It will be understood that in the normal travel of the needle bar 182, forward and back during the stitching cycle, causes the needle bar to move towards and away from the thread guiding element 202. In accordance with the invention a thread trapping or thread nipping spring element 208 is attached by a screw 210 at an inner surface of the member 202 as shown in dotted lines in FIGURES 24 and 25. The spring element 208 is normally formed with a bent end and arranged to support this bent end in a spaced relation to member 202 so as to define a thread passageway through which threads 6' and 8' may be readily drawn from the thread supply of the machine by the needles 188 and 190.

The thread passageway thus defined by the spring element 208 and member 202, is periodically opened and closed during forward and back travel of the needle bar 182. FIGURE 25 shows the spring element 208 compressed by the needle bar against the member 202 and as will be observed threads 6' and 8' are clamped in a momentarily trapped position. In this trapped position of the thread it will be observed that the needle bar and needles can draw off additional thread through the upper thread guide 216 from the machine thread supply but resistance in thread released from the guide 216 is not set up. This prevents forces which might act to draw cut ends of thread from a workpiece at the time of cutting and thence through the needles themselves so as to necessitate a rethreading operation. It will be understood that the spring element for trapping the threads is intended to be illustrative of various mechanical holding means which may be employed.

We claim:
1. In a sewing machine for stitching together a workpiece and a strip of material, a work supporting base having a sensing aperture therein, a machine stitching head having a presser foot bar attached thereto, a presser foot formed with elongated needle slots and secured at the end of the presser foot bar, said presser foot arranged to overlie a workpiece on the said base, said presser foot being formed with a guideway for continuously feeding a strip of material along an underside thereof in superimposed relationship to the workpiece, a vertically reciprocating needle bar, said needle bar being pivotally mounted in the machine stitching head for travelling movement forward and back over the presser foot during vertical reciprocation, threaded needle means fixed in the needle bar in a position to move downwardly through the presser foot and stitch the strip of material and workpiece together, a sensing device resiliently received on the needle bar, a cutting device mounted in the presser foot and slide means responsive to movement of the sensing device for forcing the cutting device downwardly through the presser foot into a position to cut said strip of material and thread.

2. A structure according to claim 1 in which the presser foot is formed with an extension having a vertical passageway therein and said cutting device includes a cutter element and a plunger resiliently supported in the presser foot for actuating the cutter element in the vertical passageway.

3. In a method of stitching in which a workpiece and strip of material are advanced together along a work supporting base and under a presser foot and stitching needles and thread are moved vertically downwardly through the presser foot into the workpiece and strip of material, the steps which comprise resiliently supporting a cutter device in a raised position in the presser foot and selectively moving the cutter device downwardly through the presser foot into cutting relationship with the strip of stitching material and thread at predetermined intervals while maintaining the pressure foot in a stationary position and periodically advancing the needles, thread, workpiece and strip of stitching material along the work supporting base while the needles and the thread are engaging the strip of material and workpiece, controlling the movement of the cutter device during a predetermined interval occurring when the needles are approximately at the bottom of their vertically downward movement, and in response to a vertically reciprocating workpiece sensing means arranged to engage an edge of the workpiece in spaced relation to the said strip of stitching material whereby the workpiece sensing means moves into and out of a sensing aperture in the work supporting base, and regulating the movement of the workpiece sensing means through the sensing aperture into the path of rotation of a bobbin threading mechanism in the work supporting base by timing the travel of the sensing means to avoid interference with the rotating bobbin threading mechanism.

References Cited
UNITED STATES PATENTS

| | | | |
|---|---|---|---|
| 766,715 | 8/1904 | Lyons | 112—253 |
| 1,387,012 | 8/1921 | Ringe | 112—130 |
| 1,450,456 | 4/1923 | Seymour | 112—213 |
| 1,765,493 | 6/1930 | Lutz | 112—252 |
| 2,151,438 | 3/1939 | Pierce | 112—252 |
| 2,997,009 | 8/1961 | Ballard | 112—253 XR |
| 3,223,059 | 12/1965 | Jacobs. | |

H. HAMPTON HUNTER, Primary Examiner

U.S. Cl. X.R.

112—213, 252, 253, 262